United States Patent
Pullen et al.

[11] Patent Number: 6,119,173
[45] Date of Patent: Sep. 12, 2000

[54] SYSTEM AND METHOD FOR COMMUNICATIONS AND PROCESS MANAGEMENT IN A DISTRIBUTED TELECOMMUNICATIONS SWITCH

[75] Inventors: Steve M. Pullen, Rowlett; Alfred J. Blanchard; Donald W. Miller, Jr., both of Plano, all of Tex.

[73] Assignee: Alcatel USA Sourcing, L.P., Plano, Tex.

[21] Appl. No.: 08/944,682

[22] Filed: Oct. 7, 1997

Related U.S. Application Data

[60] Provisional application No. 60/034,874, Jan. 27, 1997.

[51] Int. Cl.[7] ........................................... G06F 9/44
[52] U.S. Cl. ............................... 709/328; 370/410
[58] Field of Search ..................... 709/300, 303, 709/302, 100, 101, 102, 103, 104, 105, 320, 313, 328; 370/338, 410

[56] References Cited

U.S. PATENT DOCUMENTS

| | | | |
|---|---|---|---|
| 5,495,484 | 2/1996 | Self et al. | 370/110.1 |
| 5,794,018 | 8/1998 | Vrvilo et al. | 395/551 |
| 5,826,030 | 10/1998 | Hebert | 395/200.58 |
| 5,859,979 | 1/1999 | Tung et al. | 395/200.58 |
| 5,913,061 | 6/1999 | Gupta et al. | 709/300 |
| 6,049,545 | 4/2000 | Stephenson et al. | 370/410 |

FOREIGN PATENT DOCUMENTS

| | | | |
|---|---|---|---|
| 0592080 | 4/1994 | European Pat. Off. | G06F 9/46 |
| 0592091 | 4/1994 | European Pat. Off. | G06F 9/46 |
| 0602824 | 6/1994 | European Pat. Off. | H04L 29/06 |
| 0737922 | 10/1996 | European Pat. Off. | G06F 9/46 |
| 9511560 | 4/1995 | WIPO | H04L 29/06 |

*Primary Examiner*—John W. Careca
*Assistant Examiner*—St. John Courtenay, III
*Attorney, Agent, or Firm*—Baker Botts L.L.P.

[57] ABSTRACT

A system for managing a plurality of applications and communications therebetween in a distributed telecommunications switch is provided. The distributed telecommunications switch includes a service unit and at least one delivery unit. The system includes a services element residing in the service unit operable to provide a plurality of services to the plurality of applications, and an application procedure interface residing in the service unit operable to serve as an interface between the plurality of applications and the services element.

24 Claims, 6 Drawing Sheets

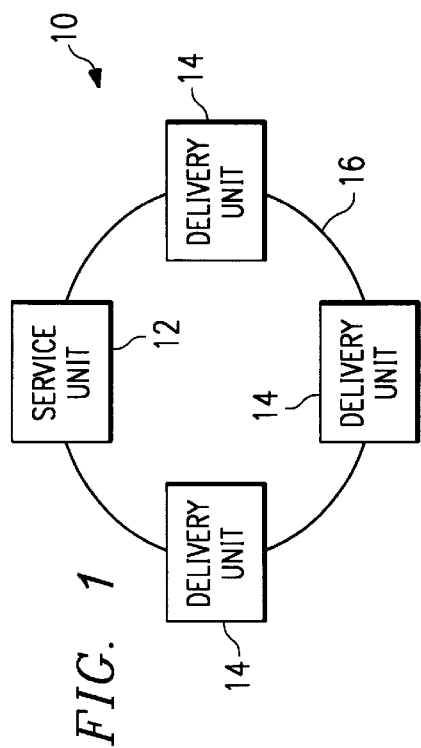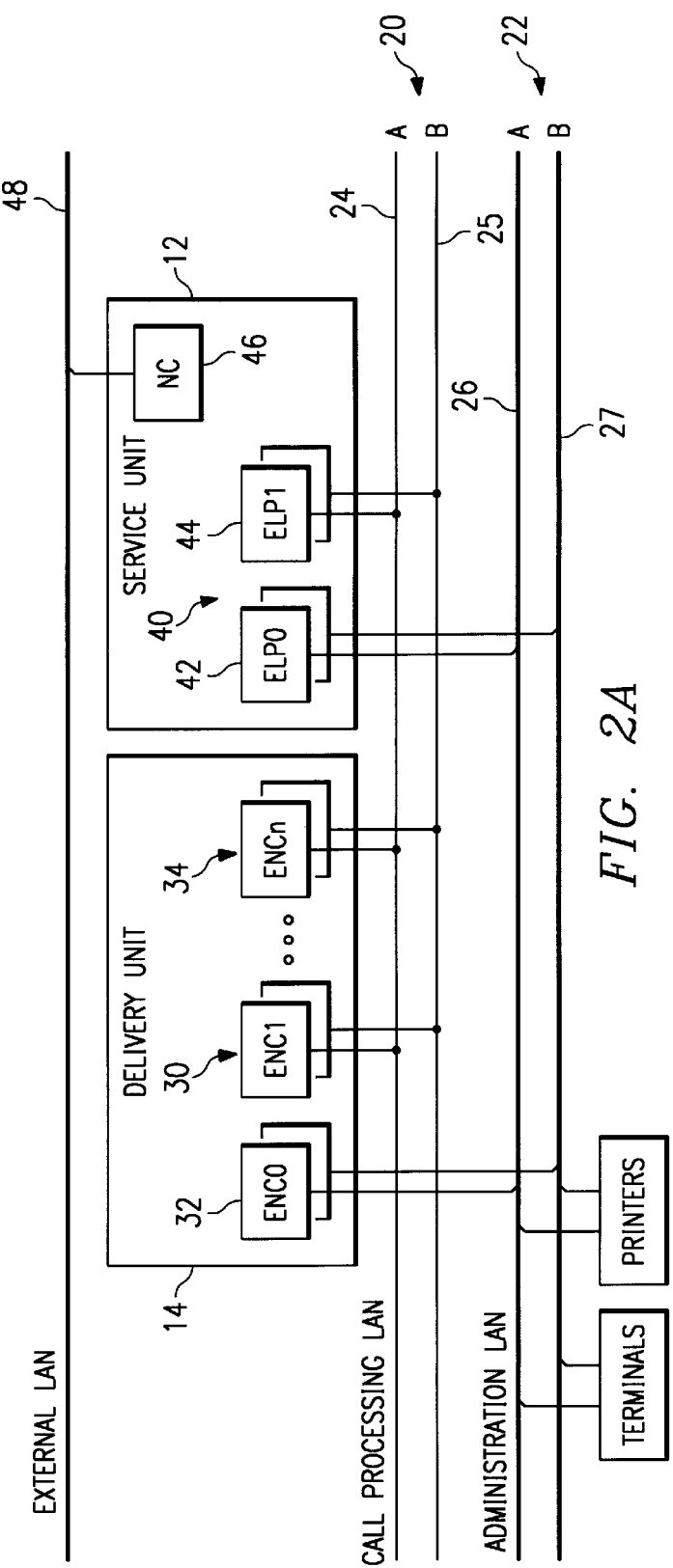

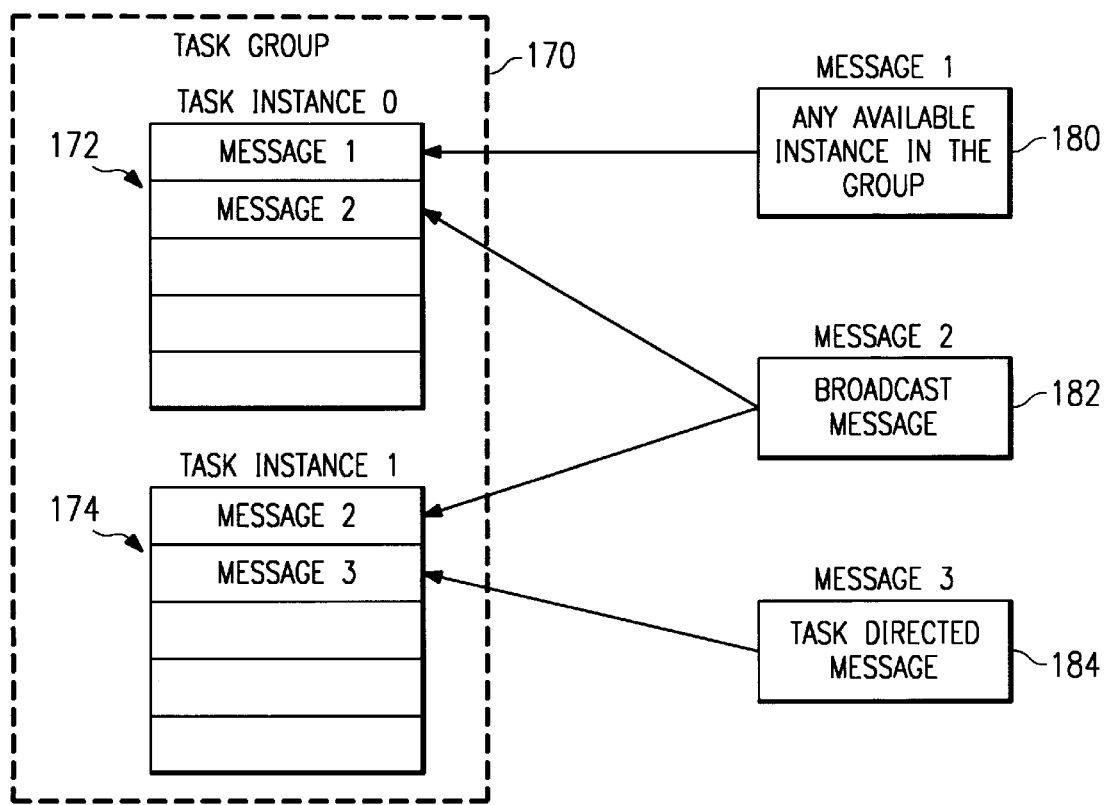
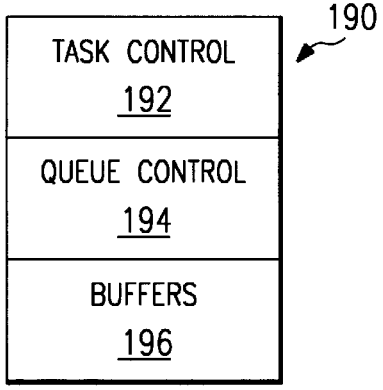
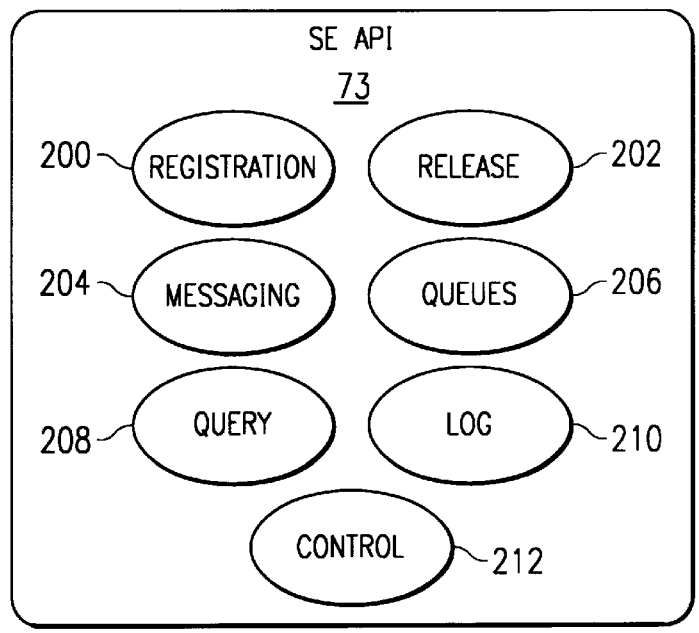

SYSTEM AND METHOD FOR COMMUNICATIONS AND PROCESS MANAGEMENT IN A DISTRIBUTED TELECOMMUNICATIONS SWITCH

RELATED PATENTS AND PATENT APPLICATIONS

This patent application claims the benefit of provisional application Serial No. 60/034,874, title *Apparatus and Method for Monitoring and Management of Telecommunications Equipment Using Enhanced Internet Access*, filed Jan. 27, 1997.

This patent application is related to U.S. Pat. No. 5,495,484, titled *Distributed Telecommunications Switching System*, issued to Self et al. on Feb. 27, 1996 ("Self"), incorporated herein by reference.

This patent application is further related to U.S. Pat. No. 6,049,545 titled *System and Method for Message Communications in a Distributed Telecommunications Switch*, filed on Oct. 3, 1997; and U.S. application Ser. No. 08/940,827, titled *System and Method for Monitoring and Management of Telecommunications Equipment Using Enhanced Internet Access*, filed on Sep. 30, 1997, both of which are incorporated herein by reference.

TECHNICAL FIELD OF THE INVENTION

This invention is related in general to the field of telecommunications systems. More particularly, the invention is related to a system and method for communications and process management in a distributed telecommunications switch.

BACKGROUND OF THE INVENTION

In a distributed system, the task of managing the processes and communications between the processes is of utmost importance. In a distributed system such as a distributed telecommunications switch described in Self, fault tolerant schemes are also required to coordinate task reassignment and message re-routing to enable continuous operation with minimum down time.

SUMMARY OF THE INVENTION

Accordingly, there is a need for a system and method for communications and process management in a distributed telecommunications switch which eliminate or substantially reduce the disadvantages associated with prior schemes.

In one aspect of the invention, a system for managing a plurality of applications and communications therebetween in a distributed telecommunications switch is provided. The distributed telecommunications switch includes a service unit and at least one delivery unit. The system includes a services element residing in the service unit operable to provide a plurality of services to the plurality of applications, and an application procedure interface residing in the service unit operable to serve as an interface between the plurality of applications and the services element.

In another aspect of the invention, a method for communications and process management of a plurality of applications in a distributed telecommunications switch includes the steps of registering each application as belonging to a simplex, primary/secondary, primary/standby, or load share task group class and assigning the application to a task group in response thereto. Messages are then routed to the registered applications based on the task group class specification of the recipient application or task group, and a fault tolerant restart process is executed based on the task group class specification of the exiting applications.

BRIEF DESCRIPTION OF THE DRAWINGS

For a better understanding of the present invention, reference may be made to the accompanying drawings, in which:

FIG. 1 is a simplified block diagram of a distributed telecommunications switching system;

FIG. 2A is a block diagram of the communications pipelines between the service unit and delivery units of the distributed telecommunications switching system according to an embodiment of the present invention;

FIG. 8 is a flowchart of another exemplary message receiving process according to the teachings of the present invention;

FIG. 9 is a simplified block diagram of a shared memory utilized by the services element; and FIG. 10 is a simplified block diagram of exemplary services element application procedure interface function areas.

DETAILED DESCRIPTION OF THE INVENTION

Figure 2B:
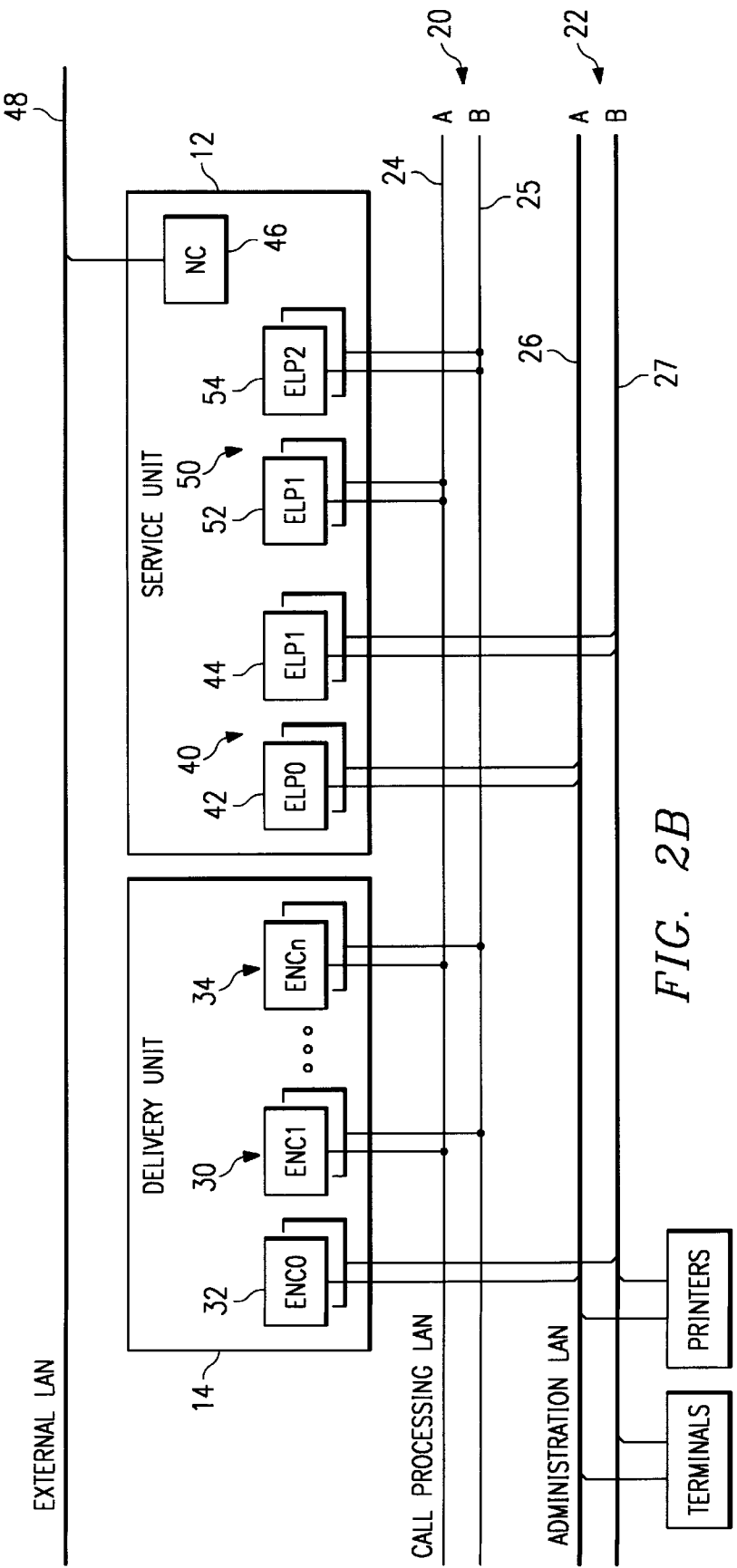
FIG. 2B is a block diagram of an alternative arrangement of the communications pipelines between the service unit and delivery units of the distributed telecommunications switching system according to an embodiment of the present invention.

The preferred embodiments of the present invention are illustrated in the figures, like reference numerals being used to refer to like and corresponding parts of the various drawings.

FIG. 1 is a simplified block diagram of a distributed telecommunications switching system 10. Distributed telecommunications switching system 10 includes a service unit 12 that provides control and management on an advanced intelligent network (AIN) service platform using information network architecture (INA) software design principles. Distributed telecommunications switching system 10 also includes a plurality of delivery units 14 coupled to service unit 12 that provide the message transport mechanism for call information under the control and management of service unit 12. Service unit 12 and delivery units 14 may communicate with one another through a fiber optic-based or electrical-based network ring 16. For details on distributed telecommunications switching system 10, please refer to U.S. Pat. No. 5,495,484, titled *Distributed Telecommunications Switching System*, issued to Self et al. on Feb. 27, 1996, incorporated herein by reference.

FIG. 2A is a block diagram of the network topology of service unit 12 and an exemplary delivery unit 14. Service unit 12 and delivery unit 14 are coupled to one another via two networks, a call processing local area network (LAN) 20 and an administration local area network 22. Call processing local area network 20 includes redundant segments, an A segment 24 and a B segment 25. Similarly, administration local area network 22 includes redundant segments, an A segment 26 and a B segment 27. Call processing and administration networks 20 and 22 may be implemented by ethernet segments utilizing the UDP/IP protocol (user datagram protocol/internet protocol). Delivery unit 14 includes a minimum of two ethernet controller (ENC) pairs 30 for interfacing with call processing and administration networks 20 and 22. One ethernet controller pair 32, ENC0, is coupled to administration network 22 and dedicated to transmitting administration messages related to network management. Additional one or more pairs of ethernet controller pairs 34, ENC1 to ENCn, are coupled to call processing network 20 and dedicated to transmitting call processing messages. The number of call processing ethernet controller pairs is determined by bandwidth requirements of the system.

Service unit 12 includes at least two ethernet link processor pairs (ELPs) 40, ELP0 42 and ELP1 44. One ethernet link processor pair 44 is coupled to call processing network 20 and is dedicated to transmitting call processing messages and the other ethernet link processor pair 42 is coupled to administration network 22 and is dedicated to transmitting administration/network management messages. Administration/network management messages transported on administration network 22 may include messages related to event reporting (alarms, information problem reports, etc.), traffic metering and measurement, and database updates. Hereinafter, the term "network controller" may be a generic term used to refer to both the ethernet link processors and ethernet controllers, or a similar controller for a network.

In this configuration, ethernet link processors utilize both corresponding network segments. In the event of an ethernet link processor failure or cable failure, messages are transported on the alternate network segment. All ethernet link processors are capable of sending and receiving messages.

Service unit 12 may further include an additional network controller (NC) 46, which may include an SCSI (small computer systems interface) controller, ethernet controller, and other hardware such as disk drives. Network controller 46 is coupled to an external local area network 48, which is used to communicate information to/from systems and components outside of distributed telecommunications switch 10.

FIG. 2B is a block diagram of an alternative embodiment of the service unit/delivery unit network topology. In this embodiment, service unit 12 includes additional pairs of ethernet link processors 50 to achieve added measures of fault tolerance. Both copies of ethernet link processor pair 42 are now coupled to A segment 26 of administration local area network 22, and both copies of ethernet link processor pair 44 are now coupled to B segment 27 of administration local area network 22. Additional pairs of ethernet link processor pairs 52 and 54 are coupled to A segment 24 and B segment 25 of call processing local area network 20, respectively.

Constructed in this manner, an ethernet link processor failure or a network segment failure may be detected and message transmission may be switched over to the functioning ethernet link processor or network segment.

Figure 3:
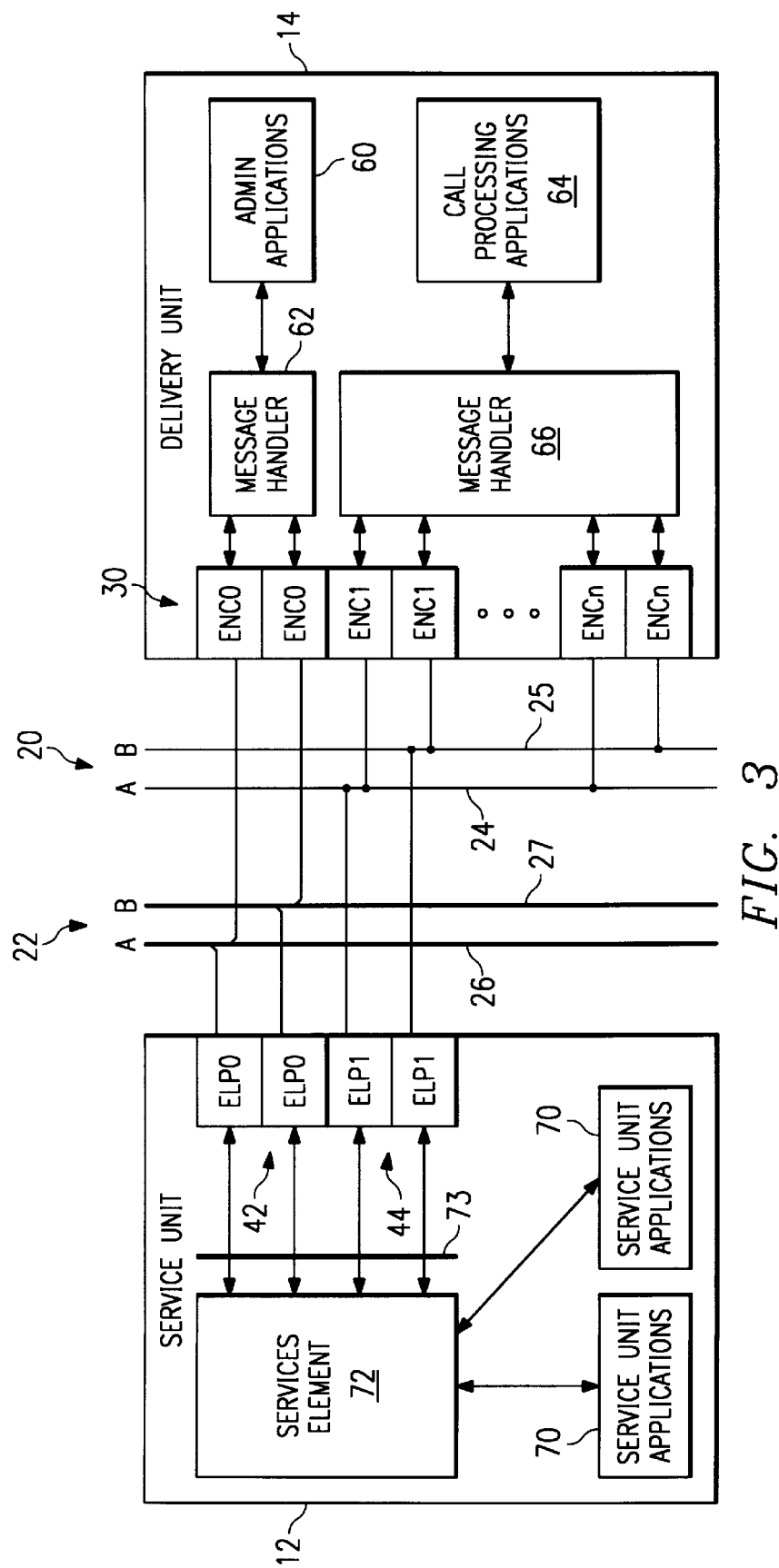
FIG. 3 is a simplified block diagram of the interface between service unit and delivery unit applications according to an embodiment of the present invention.

FIG. 3 is a simplified block diagram of the interface between applications on delivery unit 14 and applications on service unit 12. Administration applications 60 interface with a message handler 62, which communicates with ethernet controllers 30. Similarly, call processing applications 64 interface with the same or a different SU-DU message handler 66, which also communicates with ethernet controllers 30. Each message handler 60 and 62 can interface with both administration and call processing local area network segments for sending and receiving messages thereon. Service unit applications 70 interface with a services element 72, which communicate with external applications 60 and 64 through a services element application procedure interface 73 and ethernet link processor pairs 42 and 44. Services element 72 and application procedure interface 73 provide a message-based communications for interface with multiple delivery units as well as inter-service unit and intra-service unit communications.

Services element 72 may be invoked via a start-up shell script that contains all the required environment variables and parameters for proper operations. The shell script may be called as part of the platform boot procedure. Exemplary environment variables include:

SE_NODE_ID—a unique local integer identifier for the services element used to identify an instance of the services element in a network of services element;

SE_NODE_NAME—an ASCII string identifier for the services element primarily used for the convenience of human operators;

SE_ROUTE_TABLES—a fully qualified path to the services element routing information which are files that define the list of services element nodes and the application peer association for delivery unit communications; and SE_LONGFILE_NAME—a fully qualified path and name of the active log file for the services element.

Once the services element is invoked, it scans for other instances of services element. Since only one services element is allow to run on a single kernel instance, if another instance of services element exits, the present services element exits with an error. If the services element successfully starts, it either creates or attaches to segments of shared memory. The services element uses the shared memory for task management, queue management, and system buffering. The shared memory is accessible by all tasks registered with the services element. Resource locking is used to prevent access conflicts. The shared memory segments are identified by specific tokens used as keys to ensure the segments belong to the services element. The shared memory may be persistent such that the services element does not remove the segments from the system even when the services element is shut down. The memory segments are deleted during a re-boot of the operating system.

Next the network information is initialized. The routing information is read into the services element and based on the contents of the routing tables, UDP sockets are created. This process establishes the association of a remote entity to the local services element. Once all system interfaces are initialized, a log file entry is made to declare the services element is operational. From this point, applications are allow to register for service with the service element. An application is required to register prior to using the services element resources. As part of the registration process, a number of options are selected. These options control the behavior of the application as it interacts with the services element, as well as for error and recovery conditions.

Figure 4:
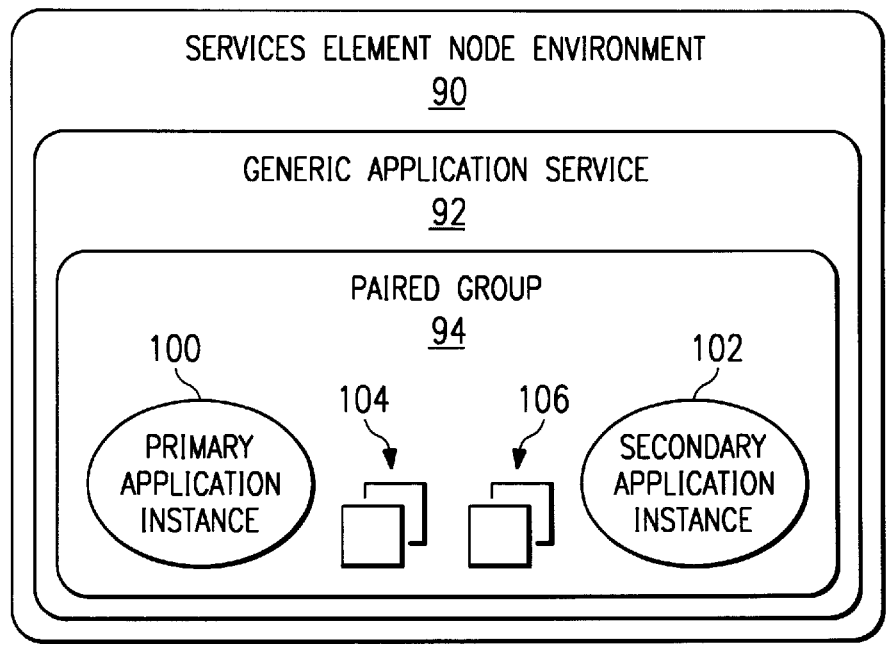
FIG. 4 is a flowchart of an exemplary delivery unit messaging process according to the teachings of the present invention.

One option is the task group class definition. Task group class definition defines which task group construct is to be applied to the application. The defined classes or paired group types are: simplex, primary/secondary, primary/standby, and load share. Referring to FIG. 4, a three-tiered task group class architecture is shown. A services element node environment may be defined or identified by the node identifier, SE_NODE_ID, a generic application service or task 92 may be defined or identified by a task name and identifier, and a paired group 94 of applications 100 and 102 may be defined or identified by a group identifier. Note that secondary application instance 102 may also be a standby application instance. Therefore, one may address a task as a specific instance of a task group by the group identifier or to the task group service in general by the task identifier.

Therefore, many of the management decision made by the services element are based on the group class. A simplex designation indicates that the application is a single monolithic application with no recovery and fault tolerant behaviors. Primary/secondary and primary/standby classes indicate the application runs with one primary instance as the main active application and another instance of the same application is allowed to run as a backup copy. One example is that the primary/secondary class of application may be set so that the secondary instance is not fully operational. The secondary instance may need some initialization to become a primary instance. On the other hand, the standby application may maintain a tight synchronization with the primary instance, and in the event the primary instance exits, the standby may become the primary instance without any additional initialization or synchronization. The load share task group class is used for those applications that have several instances that work in unison. The incoming message traffic is distributed among the registered load sharing instances. However, if a message is addressed to a specific task instance rather than the task group, the message is routed to the specified task instance.

Referring again to FIG. 4, message queues 104 and 106 are provided for receiving messages. Queues are the end repository of data and control messages for applications. Each task is assigned a home message queue 104 that is addressable by the task identifier. Home queue 104 is designated as the home queue of the task or generic application service 92. Home queue 104 holds all delivered and unread messages bound for the task. The contents of home queue 104 may be manipulated by the use of several application procedure interface functions. Additional queues 106 may be dynamically allocated and deleted as required. Queue 106 do not share the same address as home queue 104 but is accessed via a dynamic queue identifier returned from queue creation or via an ASCII name supplied by the task in the creation of the queue.

All intra-service unit messages are delivered to the destination task instance directly by a messaging task or message handler, which is described in more detail in *System and Method for Message Communications in a Distributed Telecommunications Switch*, (Attorney Docket 036560.5951). Once the messaging call returns, the task is assured that the message is either delivered or the operation failed. All inter-service unit messages or delivery unit-bound messages are sent to the services element for network routing. The distinction between the local service unit and other service unit and delivery units is made by the node identifier. Each service unit and delivery unit has a unique integer node identifier, a list of which is maintained by the services element in a node routing table. The messages are routed with consultation to the node routing table. If a message is bound for a remote services element, then the message is sent directly to that remote services element through a UDP socket already opened for that services element. The remote services element then performs additional routing on the message for local delivery. If a message is bound for a delivery unit, then a special header is applied to the message to specify the destination delivery unit node.

Figure 5:
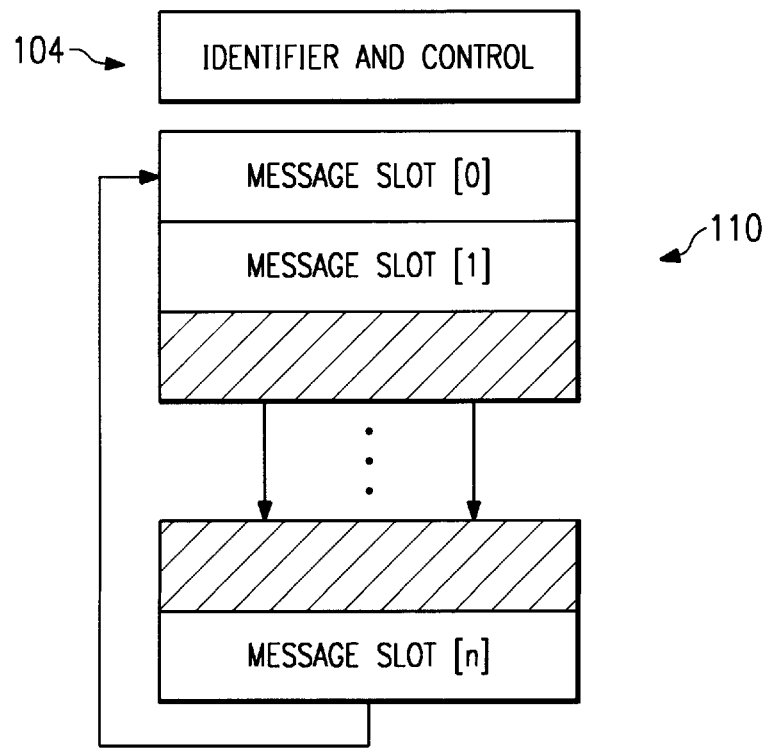
FIG. 5 is a flowchart of an exemplary delivery unit registration process as seen from the view point of the message handler according to the teachings of the present invention.

Referring to FIG. 5, a simplified block diagram of a message queue 104 is shown. Message queue 104 is addressable by the task identifier or a queue identifier and maintains read and write pointers. A message body 110 of message queue 104 may contain up to n+1 message slots, where n is a non-zero integer. Message body 110 may be implemented as a circular buffer, which may return a null value when no messages are in the buffer. Details of the message queue is shown in FIG. 9.

Services element 72 performs process management on application instances. Applications are required to register for process management services and select an application task group. Process management registration allows a particular invocation of an application task group to automatically restart. At registration, a child image of the application task group is created and returned from registration to become a running instance of the application task group. The original invocation or the parent is held in the registration function in the fault monitor mode. The parent has no services element resources allocated to it. If the child process exits with a non-null value, the parent process creates a new child process, which may bear a different instance number than the child that exited. If the child process exits with a null value, the parent interprets its exit as a shutdown request and also exits.

Figure 6:
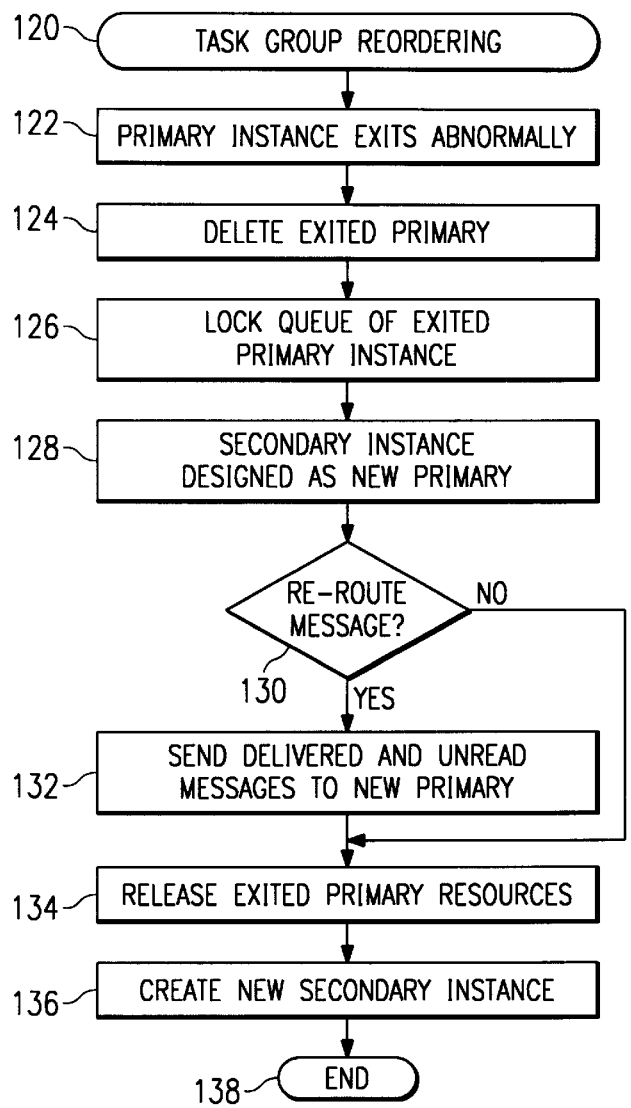
FIG. 6 is a flowchart of an exemplary delivery unit registration process as seen from the view point of the delivery unit application according to the teachings of the present invention.
Figure 7:
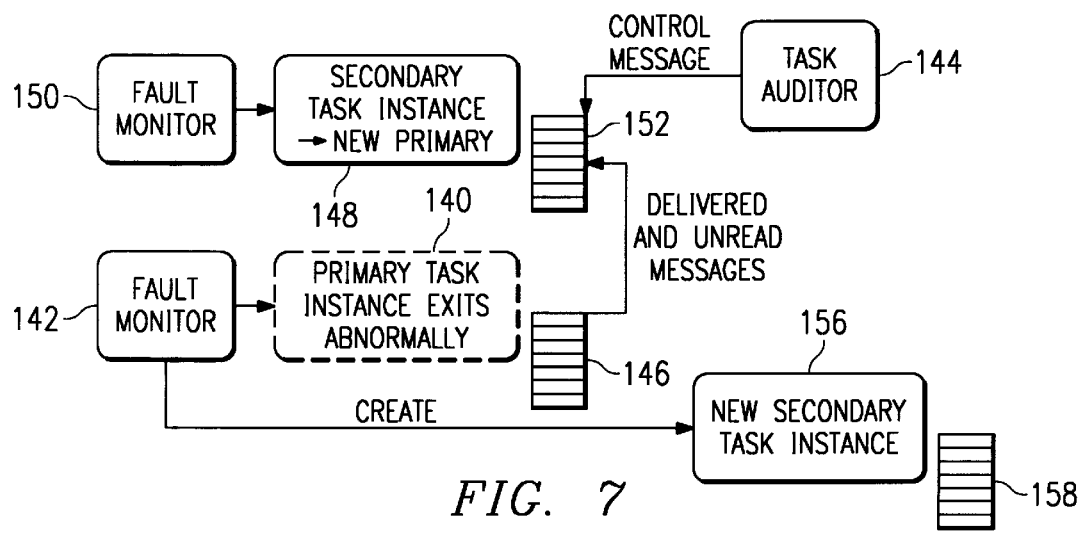
FIG. 7 is a flowchart of an exemplary message receiving process according to the teachings of the present invention.

Services element 72 also uses a task group ordering mechanism for process management. For simplex applications, no reordering is possible since there is no backup, standby, or load sharing application. On the other hand, the paired groups, hot standby and primary/secondary, may be reordered to provide continued service for the duration of fault recovery. Referring to both FIGS. 6 and 7 for an illustration of the task group ordering process. FIG. 6 is a simplified flowchart of an exemplary task group reordering process 120. In block 122, primary instance 140, monitored by a fault monitor instance 142, exits abnormally or aborts. An services element audit process 144 marks the exited primary instance 140 as deleted and locks its queue 146 to prevent further receipt of messages, as shown in blocks 124 and 126. Services element audit 144 further designates a secondary instance 148, monitored by a fault monitor instance 150, as the new primary instance, as shown in block 128. A task instance number of the new primary instance 148 is modified to reflect its new status, and a state variable of instance 148 is changed to active. A task instance may have the following states:

deleted—the task is no longer registered in the services element;

active—the task is currently on-line and processing task handling the application data messages;

standby—a secondary task instance in a paired group; it may or may not receive data messages, depending on the distribution option setting;

off-line—the task is no longer eligible to receive data or become active; it is still a running task and can transition back to standby or active states;

debug—the task is not a running task.

If a message re-routing option is enabled, as determined in block 130, then all delivered but unread messages in queue 146 of the exited primary instance 140 are redirected to a queue 152 of the new primary task instance 148, as shown in block 132. A control message is generated by services element task auditor 144 and sent to queue 152 of the new primary instance 148 to inform it of its state change. Because the operating system may allow a program to terminate without the knowledge of the running program, the service element uses task auditor 144 to scan the list of registered tasks and tests the existence of the tasks in the system. If the UNIX process identifier for a task is invalid, then the registration of that task is removed. Task auditor 144 is run periodically. This control message supersedes all data messages already in its queue 152. Fault monitor 142 then creates a new secondary task instance 156 and its queue 158, as shown in block 136. The process ends in block 138.

With load share groups, a similar process is executed for task group reordering. However, unlike primary/standby and primary/secondary groups, the tasks in the load share group is marked active, where the tasks process the data stream in parallel. Further, a load share group may also have more than two task instances. When a message arrives for the load share task group, a distribution scheme, such as round robin scheme, may be used to deliver the data messages. If any member of the task group exists at time of the fault, the group may be reordered as described above, except that no state change control message is generated and sent. If the group has the re-route message option enabled, then any unread messages from the expired group member are distributed to the remaining group members.

Referring to FIG. 8, a message distribution scheme according to task group class is shown. A task group 170 includes two task instances 0 (primary) and 1 (secondary) with associated message queues 172 and 174, respectively. A message 180 is addressed or directed to task group 170; therefore, it is distributed to queue 172 of the primary task instance. A distribution option defined at registration may alternatively specify that active instances of a task group receive data messages in a round robin ordered manner. For example, this is the default distribution method for a load share task group. A message 182 is a broadcast message; therefore, it is distributed to all group members in task group 170, and therefore are sent to both queues 172 and 174. At registration, a task group may specify that the members of the group are to receive all data messages as broadcast messages. Each member then receives a duplicate copy of the data message. However, this does not include control messages addressed to a specific task group instance. A message 184 may be addressed to a particular member, task instance 1, of task group 170. Therefore, message 184 is delivered only to queue 174 of the secondary task instance.

As described above, there are two types of messages: data and control messages. Control messages are special services element messages. When a task returns from a call to receive a message, if it is a control message, a special error code is also returned so that the task can separate this message from the normal data stream. At registration, a task may specify special handling for control messages, including call-back functions. Control messages may be generated to notify certain events, including state transition, shutdown, restart, logging level change, and flow control and throttling. State transition messages indicate that the task is changed from one state to another. A shutdown message indicates that the task is to shutdown and terminate. This message may be sent to a task to request that the receiving task instance terminate processing. A restart message is designed to request that the receiving task re-run some level of its initialization, which may include reloading table information and/or configuration. A log level change message allows an outside maintenance package to dynamically control the amount of debug information output by a program. If unusual behavior is being observed, then additional and more detailed logging information can be generated. A flow control and throttling message is used to notify a party to a service, either the service provider or the service user, is having trouble and that communications therewith should be suspended. For a more detailed description of message throttling, please refer to co-pending patent application, titled *System and Method for Message Communications in a Distributed Telecommunications Switch*, Attorney Docket 036560.5951.

Referring to FIG. 9, a simplified block diagram of shared memory 190 of the services element is shown. Shared memory 190 is used for task management, queue management, and buffering. Because shared memory 190 is accessible by all registered tasks, resource locking is used to prevent conflicts. Shared memory is divided into three main sections. A task control section 192 contains information about each registered task, task groups, and system wide parameters. A task control block within task control section 192 is allocated to each registered task and may include the following information about the task:

full address including name, group, and instance number;

current state;

queue identifier of the home queue for the task;

UNIX process identifier;

UNIX effective user identifier;

group type and group options;

program type options;

restart throttling information for fault monitor; and default logging level.

Shared memory 190 further includes a queue control section 194, which contains blocks of information related to each queue. Queue control section 194 may contain the following information:

queue identifier;

queue name;

task control block index of the owner task;

read and write pointers to message slots in the queue;

n message slots;

socket descriptor for socket notification;

thread access mutux;

task permissions lock; and forward message indicator.

Shared memory 190 also includes memory for buffers 196.

The services element implements several source locking mechanisms. The semaphores are thread based and are used to control access to certain management areas. The services element uses a coarse grain locking mechanism on task control section 192. A single semaphore may be used to control access to data stored in task control section 192. Because task control data is modified only during task registration and release, the use of one semaphore to control access thereto is sufficient. Additionally, there is another semaphore used for the task group control, which is also used during task registration and release.

Queue control section access is more frequent than the task control section, and therefore fine grain control is needed. Each queue has its own semaphore so that each queue may receive messages independent of other queues, and concurrent messaging may be achieved.

In addition, each registered task is given a logging mutex, which ensures single threaded logging occurs for each task. No two threads of a task may log an event at the same time. It is a blocking process, so other threads are held up until the active logging thread is finished and releases the mutex.

As described above, services element 72 includes an application procedure interface 73 (FIG. 3). FIG. 10 is a simplified diagram showing exemplary interface functional areas provided by the application procedure interface. These include registration 200, release 202, messaging 204, queues 206, query 208, log 210, and control 212 functional areas. The application procedure interface may be implemented in a shared object library that is linked to the applications at run time. The description below sets forth additional details of the application procedure interface and its interface functions 200–212.

As described above, an application which desires to use the services of the services element is required to register. The application procedure interface includes a registration function which may have an exemplary syntax:

```
int seRegister(char *name, int tid, int group, int *number,
    APP_CTL *options);
```

The applications may call this function, which returns an SE_AOK on registration success or an error code indicating the nature of the failure. The parameter "name" may be an ASCII string that is used to identify the specific task, and is required to be unique to the system. The task identifier, "tid," is a required parameter that is a unique number that is pre-assigned to all tasks in the node. The "group" parameter is a pre-defined number to indicate a logical grouping for this task. The "number" parameter is an integer address of user local variables. The registration function outputs the logical number (instance) of the registering task group member. In application task groups that allow for multiple instances, this value equates to the current instance number of the application task group at the time of registration. Each task group type specifies the maximum number and states of group instance members. Thea last parameter is the "options" structure. This address of a user local data element contains the required information to configure the application into the services element node environment. An exemplary options structure is:

```
u_int       options;
u_int       group_mode;
u_int       route_mode;
void        *control_event[CE_NEVENTS] (int);
```

The "options" field is an ORed bit-field that contains per application definitions, which includes:

SE_THREAD—This task is a multi-threaded program. This allows all threads of the process to message and log if so desired. A program that uses the thread library at all, is required to set this option.

SE_NOMEMB—This task is a remote process that is networked into the local services element. In this case, a remote process is defined to be one not resident in the local system. This utilizes a strictly socket based form of communication.

SE_SOCKNT—Socket level notification of message arrival. This indicates that the reception of a message is managed based on a local socket rather than the arrival of a signal, which is the default. If the registration application procedure interface detects that the application UNIX user identifier is not the same as the services element UNIX UID, then the socket option is automatically applied. If an application is making special use of the "SIGUSR1" user signal, this conflicts with the services element's use of "SIGUSR1" and this option needs to be supplied by the application.

SE_FIPROC—This indicates that this task is to run as a fault tolerant process. This causes a dual image of the task to be created. The new child image is returned from the registration call. The parent is held in the registration, monitoring the health of the newly spawned child. Should the child die, a new child is created. This continues until the child exits with a status of NULL or the parent receives a termination request. There is at present a two second delay between the respawning of a child to prevent any excessive thrashing. Values for thresholding and restart limits are available. This provides a transparent restart of a Task group member with its environment intact.

SE_CBNTFY—Use call-back procedures for notification of control messages. These control messages, by default, are received as data messages with an error code of SE_CNTRL to allow the application to separate it from its normal data messages stream. This option allows the application to specify special message handlers to process the messages rather than receive the messages in the normal data stream.

The next element in the APP_CTL structure is the "group-mode" field. This field defines the group class type of application that is registering. The group class type applies to the application group as a whole and should be consistent with all instances of an application that register for service. The group class types are simplex, primary/standby, primary/secondary, and load share as described in more detail above.

The "route_mode" field of the option structure is used to indicate any special message delivery mode that should be applied to the application group. These control the services element message delivery for application groups through state changes, restarts, shutdowns, and normal operations. They are:

SE_NBMSG—In normal operations for the group type, broadcast all data messages to all application instances in the group. This does not apply to targeted messages where an application is sent a message and the message specifies a specific instance of the application. The default is to send the data message to the "First available" instance of the application. This insures that a standby application receives a copy of the message even though it is in a standby state.

SE_NDMSG—In normal operations for the group type, distribute the data messages across all instances of the application. This applies only to load share group types that process data in a distributed fashion. Data messages are delivered in a round-robin fashion.

SE_FMSG—If an application group member is in a state other than active, it would not normally receive a data message. This option forces a delivery of the message to a process that is in any other state except "Deleted."

SE_RTMSG—If an application is switched from active to any other state (i.e. off-line, deleted, etc.), then all messages in its home queue are re-routed to the first available active member of the application group. The default behavior is to delete all pending messages if the application is removed and to leave messages in place for state transitions.

The remaining options are application supplied functions that act as call-back routines for the defined operation. An additional parameter is supplied to further qualify the nature of the event that triggered the call-back.

CE_STATE—The first call-back event is the state transition event. This is one means for an application to receive notification that its application has received a state change as a result of Task group reordering or craft interaction. Craft interaction includes:
1. Requests for switching the active and standby applications
2. Off-lining an application.

CE_SHUTDOWN—The next call-back event is shutdown. The integer qualifier for shutdown indicates two states, graceful and forced. The distinction comes from the source that triggered the event. If a crash is occurring, this is a forced shutdown. If a craft requests the application to exit then this is a graceful shutdown. These types of shutdown determine the amount of cleanup and recovery that can be performed by the application.

CE_RESTART—The next call-back event is restart. Restarts are leveled as a "hot" "warm" and "cold." These levels determine the depth to which the application should re-initialize. The services element has no restrictions on what an application does at each level. It is application specific as to how much re-initialization should occur. The routine is intended as an event handler. It should not call the actual initialization code itself. It should set up information in the application to manage the initialization request. As a guide, these are provided as a general definition for each level.
Hot—A restart that does no major initialization. A primary function could be Task synchronization or file synchronization.
Warm—A restart that involves small amounts of re-initialization. This could include parameter, translation or other data tables.
Cold—A restart where all the program initialization is performed. The primary difference from the initial program load (IPL) is that no new allocation of resources is performed. The existing resources are simply re-initialized.

CE_THROTTLE—This event is for applications to communicate a peer to peer event that indicates a congestion building on the originator.

CE_LOGLEVEL—This event is used to communicate the level at which logging should be performed. All trace output from a program is controlled programmatically through the log level.

To de-register the applications, an SeRelease( ) application procedure interface function may be called. This application procedure interface function terminates the services element registration for the application and frees all allocated resources therefor. It is called in all cases where the application intends to exit. The syntax is as follows:

void SeRelease(void);

This function call also causes a check of the fault tolerant aspects of the task group to which the calling task belonged. This includes message re-routing and task group ordering.

As indicated above, there are two main methods to message passing in the services element. They consist of the task group messages which are addressed to specific application services, and local queue based messages. These two types of messages have different associated application procedure interface functions as well. The general operational behavior of the two types are, however, very similar.

In addition, there are two application procedure interface functions that allow the application to access the services element message buffer pool. These are not required for messaging, but an application that makes use of these functions, or that requires the use of the forward and reply message feature must also be aware of these functions.

The exemplary syntax for the message buffer functions is:

int SeGetbuf (void **buffer, int size);

Where "buffer" is an address of a user local pointer variable to hold the address of the system buffer and "size" is the total size in bytes required by the task. The valid range in buffer sizes are from one byte to 64 Kilobytes.

```
void SeRelbuf (void *buffer);
``` where the "buffer" is the address of the system buffer that is being released. Once the buffer is released, it is no longer a valid reference address for the task.

As described above, there are three ways to send a message to a task group address:

1. Send or originate a message to a task group or task group instance;

```
int SeSendmsg (int node, char *name, int tid, int group, int num,
        void *msg, int size, int options);
```

2. Forward a received message to a task group or task group instance;

```
int SeFwrdmsg (int node, char *name, int tid, int group, int num,
        void *msg, int size, int options);
```

3. Reply back to the originator of a specific message.

```
int SeRplymsg (void *msg, int size, int options);
```

The use of the calls is open to application implementation requirements. The send message function creates an original message and is the general purpose message function. The forward message function is used to send the message to another task in the local services element or a remote services element but the original routing information is not changed. The reply message is used to send a blind reply to the originator of the message. The routing information for source and destination are swapped.

The "node" parameter of the destination is required. This is a unique site identification for a specific system in the network. This is also a pre-defined item of a system at installation. A local identifier may be used to indicate that the caller is referring to its local Node of residence.

A "name" parameter is supplied to identify the destination of the message. This may be an ASCII NULL terminated string that contains the well-known or pre-defined name of the task. If a NULL pointer is supplied for "name" then the task identifier "tid" is used to identify the destination. The name of an application has precedence.

A task identifier "tid" may be required to identify the specific pre-defined application of the destination. This "tid" is a pre-assigned value in the system as part of application definition and implementation. The local identifier M_SAME may be used to indicate the caller is referring to the same task identifier as itself. A single node is able to contain more than one instance of the same task identifier. Also, an M_BROADCAST is specified to indicate that all local tasks of the same identifier are to receive a copy of the message. A NULL may be specified if the caller is using the "name" to identify the destination task.

"group" is a collective of similar functional entities. It is a further subdivision of a "tid" (group in task). This establishes a logical grouping of functions within the task. It is a predefined item and should be known to the message originator. The valid range for groups are 1 up to SE_GRP_MAX. The identifier M_SAME is used to indicate that the destination group has the same group identifier as the message originator. The identifier M_BROADCAST is used to indicate the destination is all task groups defined by "tid" or "name."

The final parameter for the destination process is the "num." This indicates the instance number in the group of the task to which the message is sent. Load sharing groups can consist of up to SE_NUM_MAX members. Other types of groups are either single or paired member groups. There are a series of convenience defines to indicate the primary, or active, instance member or standby instance member (I_A_PROC, I_B_PROC). There are also some control identifiers to qualify the instance of the destination. For example:

M_SAME identifier is used to indicate the destination instance is the same as the message originator.

M_BROADCAST is used to indicate the all task group instances are to receive a copy of the message.

Identifier I_NUM_ANY is used to indicate the any active instance is eligible to receive the message. In this case the destination instance is determined at delivery.

The indicator I_OVERRIDE is used to indicate special handling for message bound for the delivery unit. The override indicates that the "options" field contains special message routing options that are specific to the delivery unit and override the default message routing for the delivery unit-bound messages.

M_DIST_NUM is used to indicate that the destination of the message is the next active instance in the application group where the destination task group is a load share configuration.

The "size" is an indication of the number of bytes that are in the message. The range of values for message size may be limited to 1 byte to 64 kilobytes, for example. Network communications may impact the upper limit of the message size. This is implementation specific. A non-NULL value must be supplied for this field. The SeSendmsg( ) function may be used to determine if it is a user local data buffer or if it is a services element system buffer.

The "msg" variable is the address of the user local area where the data is stored. It may also contain a services element node system address that is pre-allocated from services element system resources for this message.

"Options" may be a series of bitwise ORed message specific options. The low order byte of the options indicate a special routing override for delivery unit-bound messages. These are defined in a header file, "se_id.h." An application may control the delivery unit side routing of messages with this value and an I_OVERRIDE in the "num" parameter. The other values for this field are specific to service unit message delivery. For example:

A priority message may be specified with a M_PRIORITY identifier. A priority message is placed at the top of the destination application queue.

An M_CERTIFY identifier indicates that a certified message is to be delivered. This returns a message delivered indication to the originating application.

Additional message resources are available to be used for thread communication, job queuing, and even application messaging. Queues can be addressed by two methods, an ASCII name or the queue identifier, as discussed above. The queue identifier, however, is only unique for a queue between the creation and deletion of the queue. There are four methods available to access queues. These are:

```
int SeQcreate (char *name, int *qid);

int SeQdelete (char *name, int qid);

int SeQpost (char *name, int qid, char *msg, int len);

int SeQpend (char *name, int qid, int tmo, int *msg, int len);
```

The "name" parameter is used to locate the queue. The "name" is a NULL terminated ASCII string that matches the name used to create the queue. If a NULL pointer is supplied for this parameter, the "qid" is used to locate the queue on which to pend.

The "qid" parameter is a variable that contains the valid queue identifier. This identifier is unique to the local node only. This is the identifier returned from the queue's creation. If a non-NULL "name" is supplied, this value is ignored, since the "name" parameter has precedence over the queue identifier.

The caller may specify a time out with the "tmo" parameter. This integer value indicates the duration, in seconds, the caller should wait for a message to arrive in the queue. If a value of NULL is specified, then the caller will wait forever for a message to arrive. The wait can be interrupted by the receipt of an event such as a signal. This event may not even be related to the waiting thread in a process. In the event of an interrupt with a wait forever condition a predetermined error code is returned.

The "msg" parameter is an address of the user message data. The message can be in user local data space or contained in a pre-allocated SE system buffer resource. The SeQpend( ) function differentiates between the two with the next parameter. If the "len" is a non-NULL value, SeQpend( ) assumes the "msg" is an address of a user local data buffer into which the data is to be written. If the value of "len" is a NULL then SeQpend( ) assumes that "msg" is the address of the user local pointer variable. It places the address of the data message in the contents of the "msg" parameter. The SeQpost( ) function automatically determines the if the "msg" parameter is a system buffer or a user local buffer.

The "len" parameter is the actual data length of the maximum message to receive. If the value is a NULL, the pending routing receives the message in a services element system resource buffer. The address of the buffer is placed in the address pointed to by "msg." Otherwise the "len" is used to limit the amount of data to write into the area pointed to be "msg."

There are also application procedure interface function that may be called by a task to query its environment. The types of query are:

Node information
Queue information
Task information

Node information is available to applications at run time. The following functions outline the available local services element node information.

The services element node identifier functions return either a numerical value or the ASCII name of the local services element node. These are unique, run time adjustable parameters for every services element. The services element node name is used for human reference but is not used as part of the services element messaging. However, the node identifiers is used as an index into the node routing table.

Many applications may wish to query their queue-based resources. The following functions outline the available information that is available at run time. The application procedure interface syntax is as follows:

```
int SeQquery (char *name, int qid, QUE_INFO info);

int SeQnam2num (char *name);

int SeQnum2nam (int qid, char *name);
```

The queue query functions perform the translation of the queue ASCII name representation to the current queue identifier and from the queue identifier back to the ASCII name. This allows external applications that wish to share a common queue to locate the queue or to re-synchronize in the event of a restart. A particular queue can be queried for extended information. This query fills out a predetermined informational status structure about the nature of the queue being queried. An example of the format of the queue informational status structure is:

| u_char | tid; |
| u_char | grp; |
| u_char | num; |
| u_char | msg; |
| char | name[SE_NAM_MAX]; |

The "tid" is the Task identifier of the queue owner, "grp" is the group identifier if the queue owner, and "num" is the actual instance number of the queue owner. The "msg" is the current count of unread messages in the queue. The "name" is the ASCII string, NULL terminated identifier of the queue. For this query the "name" or the "qid" may be supplied but both are not required.

A similar set of application procedure interface functions exists to query tasks. These functions allow a task to translate a task name into a task identifier and to translate the task identifier back to the name. These values are used for messaging. A message can be address to a "named" task as well as a task identifier. Both values translate to the same destination, however, the name value carries precedence.

```
int SeWho (char *name, int tid, int group, int num, TASK_INFO
  *info);
int SeTnam2num (char *name);
int SeTnum2nam (int tid, char *name);
```

The SeWho( )function fills in the supplied structure with the pertinent information about the queried task, if the task is a currently registered member in the services element node. The TASK-INFO structure has the following exemplary format:

```
u_char      tid;
u_char      grp;
u_char      num;
u_char      state;
pid_t       pid;
```

These entries are also marked with a time stamp and information on the originator of the log message. The first line of text contains the type of program logging, time stamp, and severity of the log entry. The next line contains the full services element identification of the originator of the log entry. The last line is the user supplied text. All entries are separated by a record terminator for ease of both record parsing and readability. An example entry follows:

```
TYPE:APPL SEVERITY:INFO      DATE: Fri Sep 6 16:50:31 1996
    NAME:CALL-PROCESSING     PID: 6377      TID: 2 GRP: 1 NUM: 0--
REGISTRATION complete for Application CALL_PROCESSING -- TID:2
: : :
```

-continued

```
uid_t       uid;
char        name[SE_NAM_MAX];
```

The "tid" is the Task identifier, "grp" is the group identifier and "num" is the actual instance number of the application. The "state" parameter is the current operational state of the application. The "pid" is the actual UNIX process identifier for the queried application. The "uid" is the numeric representation of the UNIX user identifier under which the queried application is running. The "name" is the ASCII string, NULL terminated identifier of the application.

A "tid" may be required to identify the specific predefined application of the destination. This "tid" is a preassigned value in the system as part of application definition and implementation. The "grp" parameter is a used to further qualify the task that is being queried. The "num" parameter indicates the instance number in the group of the task about which the query is made.

Two additional application procedure interface utilities allow tasks to log their activity and generate specialized control or event messages. The log application procedure interfaces function allows a task to generate an entry in a services element disk-based log files.

```
void SeLogevt (int level, char *text);
```

The user supplies a free format string of text for up to 80 characters with no new line terminator at the end. In addition, the task can specify a severity "level" to the information that is being generated. The four defined "levels" are:

Informational—General non-error operational information indication.

Warning—An indication of a resource problem or processing failure that did not create a loss of service, but could indicate a service degradation.

Error—An indication that a failure has occurred that represents a degradation or loss of service provided by the application.

Fail—A fault has occurred that forces the application to terminate its service. This may also indicate that the application must terminate.

The control and event message application procedure interface allows tasks in the services element to generate specific types of non-data messages for application special handling. The control messages are delivered either as a standard message or through a call-back function. The default method is for a task to receive the message with a special error code to indicate that this is a valid message but that it is not part of the application data stream and special processing is required. An exemplary application procedure interface syntax is as follows:

```
int SeControl(CONTROL_MSG *msg, int node, char *name, int
    tid, int grp, int num, int opt);
```

Where the control message is contained in the task local structure CONTROL_MSG. This structure has the following exemplary format:

```
u_short     control_event;
u_short     qualifier;
```

The "control_event" is one of the types defined in a predetermined header file, "se_msg.h". Each control message has a qualifier to further specify the types of events that are being generated. The defined functionality for each of the qualifiers, as well as the event itself, is an application implementation decision. Examples of the defined qualifiers are:

```
CE-STATE
    SE_ACTIVE
    SE_STANDBY
    SE_OFFLINE
    SE_DEBUG
CE_SHUTDOWN
    CQ_GRACEFUL
    CQ_FORCED
    CE_RESTART
    CQ_HOT
    CQ_WARM
    CQ_COLD
    CE_THROTTLE
    CQ_TON
    CQ_TOFF
    CE_LOGLEVEL
```

The qualifiers are described in more detail above. The log level is generally used to indicate the severity level of the log mentioned in this section. However, the interface is such that a task can make any interpretation of the level and issue additional log messages for tracing and profiling.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A system for managing a plurality of applications and communications therebetween in a distributed telecommunications switch, which includes a service unit and at least one delivery unit, the delivery unit providing a message transport mechanism for call information, the service unit providing control and management of the delivery unit, the system comprising:

a services element residing in the service unit operable to provide a plurality of services to the plurality of applications residing in the delivery unit;

an application procedure interface residing in the service unit operable to serve as an interface between the plurality of applications residing in the delivery unit and the services element; and a message handler residing on the delivery unit, each of the plurality of applications residing in the delivery unit operable to register with the services element residing in the service unit through the application procedure interface and the message handler in response to a non-existence of another services element, the message handler operable to route messages between the services element and the registered applications through the application procedure interface.

2. The system, as set forth in claim 1, wherein the application procedure interface comprises a plurality of interface functions.

3. The system, as set forth in claim 1, further comprising paired groupings of the plurality of applications, each paired grouping being identifiable by a group identifier.

4. The system, as set forth in claim 1, further comprising paired groupings of the plurality of applications, each paired grouping having a primary task and a secondary task.

5. The system, as set forth in claim 1, further comprising paired groupings of the plurality of applications, each paired grouping having at least two load sharing tasks.

6. The system, as set forth in claim 1, further comprising a shared memory accessible by the services element, the application procedure interface, and the plurality of applications.

7. The system, as set forth in claim 2, wherein the plurality of interface functions comprise a registration function which registers the plurality of applications prior to becoming eligible to use the plurality of services provided by the services element.

8. The system, as set forth in claim 2, wherein the plurality of interface functions comprise at least one messaging function which allows the plurality of applications to send and receive messages therebetween.

9. The system, as set forth in claim 2, wherein the plurality of interface functions comprise at least one query function which allows the plurality of applications to obtain predetermined information about their environment.

10. The system, as set forth in claim 2, wherein the plurality of interface functions comprise at least one log function which allows the plurality of applications to record predetermined data about their operations.

11. The system, as set forth in claim 6, wherein the shared memory is divided into a task control portion and a queue control portion.

12. The system, as set forth in claim 6, wherein the task control portion comprises data about each registered application.

13. The system, as set forth in claim 6, wherein the queue control portion comprises a plurality of message queues for the plurality of registered applications.

14. The system, as set forth in claim 7, wherein the plurality of interface functions comprise a release function which de-registers the plurality of applications in order to terminate their eligibility to use the plurality of services provided by the services element.

15. A method for communications and process management of a plurality of applications in a distributed telecommunications switch, comprising the steps of:

invoking a services element residing in a service unit to provide services to the plurality of applications residing in a delivery unit;

determining an existence of another services element;

registering each application as belonging to a simplex, primary/secondary, primary/standby, or load share task group class and assigning the application to a task group in response thereto, each application being registered with the service element in response to a non-existence of another services element;

routing messages to the registered applications based on the task group class specification thereof; and initiating a fault tolerant restart process based on the task group class specification thereof.

16. The method, as set forth in claim 15, wherein the message routing step comprises the step of routing messages only to the application specified as a simplex application.

17. The method, as set forth in claim 15, wherein the message routing step comprises the step of routing messages to only primary applications specified as belonging to the primary/secondary task group class.

18. The method, as set forth in claim 15, wherein the message routing step comprises the step of routing messages to both primary and standby applications specified as belonging to the primary/standby task group class.

19. The method, as set forth in claim 15, wherein the message routing step comprises the step of broadcasting messages destined for a task group to all applications belonging to that task group.

20. The method, as set forth in claim 15, wherein the message routing step comprises the step of distributing messages destined for a task group to all applications belonging to that task group in turn in a predetermined manner.

21. The method, as set forth in claim 15, wherein the message routing step comprises the step of delivering a message destined for an application to its queue.

22. The method, as set forth in claim 15, further comprising the step of re-routing messages destined for an exiting primary application based on the task group class specification thereof.

23. The method, as set forth in claim 22, wherein the message re-routing step comprises the steps of:

deleting the exiting application;

designating a secondary or standby application as primary application; and routing delivered and unread messages to the primary application.

24. The method, as set forth in claim 15, further comprising the step of periodically auditing registered applications to determine whether they are still running.

* * * * *